Figure 1:
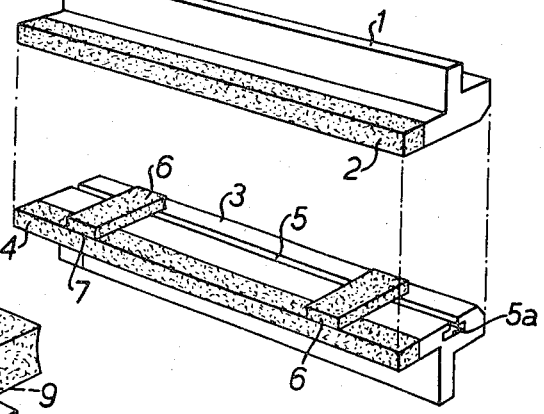
Figure 2:
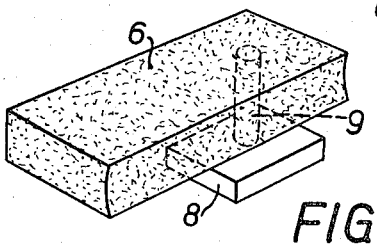
Figure 3:
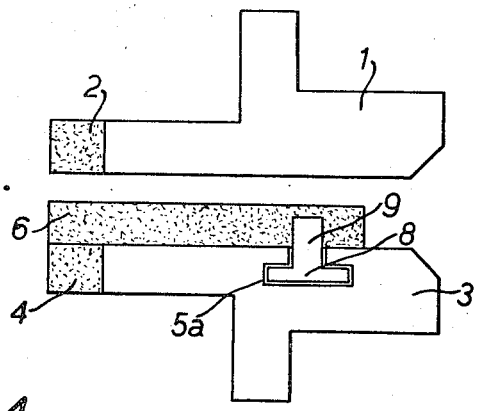
Figure 4:
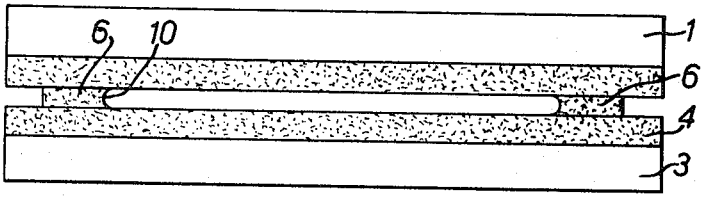

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 24, 1970

880 O.G. 1162

T880,006

BUTT SPLICING MACHINES

James D. Adams, 67 Bld. Mettewie, Brussels, Belgium, and Norman E. Odam, 29 Roger Van der Weydendreef, Overijsse, Belgium

Filed Dec. 22, 1969, Ser. No. 887,038
Int. Cl. B29h *15/00*
U.S. Cl. 156—503
1 Sheet Drawing. 10 Pages Specification

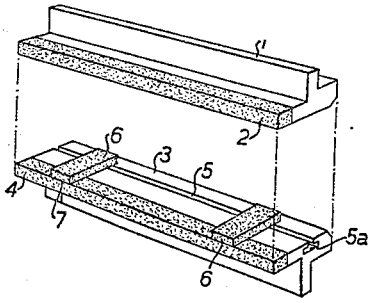

An adjustable clamp for holding an element, such as a tire inner tube, which is to be butt spliced with a mating element held in a similar clamp. The clamp has two relatively movable jaws. At least one of the jaws is provided with two spacing members which are relatively movable to accommodate inner tubes of different widths. The spacing members are held clamped by the jaws when the tube is clamped and they thus confine the edges of the tube when it is under compression.

Nov. 24, 1970 J. D. ADAMS ET AL T880006

BUTT SPLICING MACHINES

Filed Dec. 22, 1969